April 9, 1935.    R. F. GOOD    1,996,760
SLIP INDICATOR
Filed Nov. 17, 1932

INVENTOR
ROSCOE F. GOOD
BY
Robert A. Lavender
ATTORNEY

Patented Apr. 9, 1935

1,996,760

UNITED STATES PATENT OFFICE 1,996,760

SLIP INDICATOR

Roscoe F. Good, United States Navy

Application November 17, 1932, Serial No. 643,126

1 Claim. (Cl. 88—14)

(Granted under the act of March 3, 1883, as
amended April 30, 1928; 370 O. G. 757)

This invention relates to a device for indicating slip, or relative change in rotational phase, between a driving and a driven shaft or between any two coacting rotating members.

It is the object of this invention to provide apparatus of the type specified that will be simple and cheap to construct, involve practically no expense for upkeep, easy to use and accurate in its indications.

With the above and other objects in view, the invention consists in the construction, combination and arrangement of parts as will be described more fully hereinafter.

Figure 1:
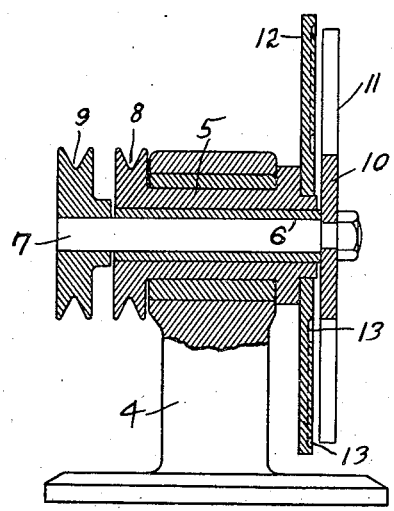
Fig. 1 is an axial sectional view on line A—A of Fig. 2.

It is frequently desirable or necessary to determine the slip between a rotating driving element and another element driven thereby through a belt or other friction power transmission means or by an oil clutch or the like. In the form of my invention for measuring slip shown in Fig. 1, the pedestal 4 has journaled in it a hollow shaft 5 lined with antifriction metal 6 within which a second shaft 7 is independently rotatable, upon which shafts the pulleys 8 and 9 are respectively secured and whereby the former shaft may be driven by one of the elements whereof the rotation is to be compared and the latter may be driven by the other of those elements. Upon shaft 7 is fixed a disk 10 having in it radially extending slots 11. The disk 12 on shaft 5, back of disk 10, has in its face that is adjacent disk 10 arcuate grooves 13 equal in number to the slots in disk 10. The grooves 13 are so disposed that when the projection of the radially inner end of one of the slots 11 coincides with the corresponding end of a groove, the projection of the radially outer end of the next slot in advance thereof coincides with the outer end of the same groove and are bent with a curvature that constantly increases from their inner to their outer ends whereby the greater linear speed of the outer portions of the disk are compensated and the apparent movement of the groove along the slot is at a constant rate. The grooves 13 may be painted in any manner to make them readily visible, or a luminous paint may be used therein.

Figure 2:
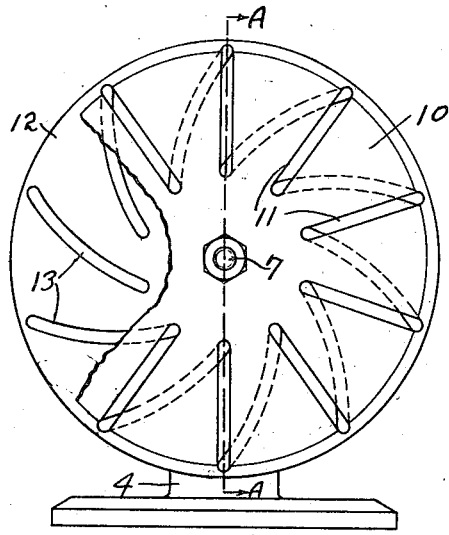
Fig. 2 is an elevational view of the rotating disks, with part of the outer disk cut away.

It is apparent that if disk 12 is rotating at the same rate as a driving shaft and disk 10 at the same rate as a shaft driven thereby and there is no slippage between them and the two disks had the relative positions as shown in Fig. 2, they would remain without change in that position with a portion of a groove showing at the extreme end portions of each of the slots 11. On the other hand, if disk 10 is rotating faster than disk 12, the portion of the groove seen through a slot will move successively farther out radially until when the former disk has gained upon the latter an angle equal to the angle between two adjacent slots, it will have moved from the inner end of the slot to the outer end thereof. If disk 12 is rotating the faster, the apparent movement of the visible portion of the groove will be in the opposite direction. It is to be noted that the number of slots should not be so great that persistence of vision will prevent distinguishing one slot from another. The number of complete transits of a slot over a groove during a given time interval divided by the number of slots gives the difference in revolutions during that interval between the elements whose rates are being compared. Since all the slots have the same relative position with respect to the grooves, it is necessary to watch but one position, such as the uppermost one, and it is not required that any individual slot be followed by the eye.

Figure 3:
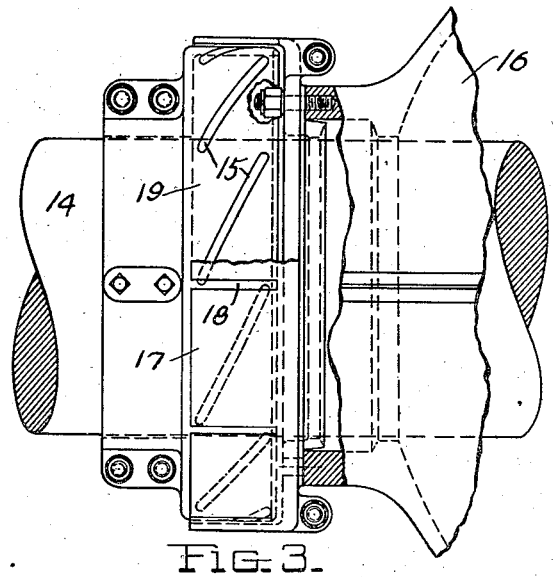
Fig. 3 is a side view of an embodiment having drums in place of the disks shown in Fig. 1.

In Fig. 3 the inner drum 19 is fixed on shaft 14 to rotate therewith and has on its outer surface diagonal grooves 15 painted white or with luminous paint as in the case of grooves 13 in disk 12. The member 16 is connected to a torsional vibration damping coupling device through which power is transmitted to shaft 14 and which is free to rotate with respect to shaft 14. This particular type of coupling requires a certain degree of slippage between the driving shaft to which member 16 is connected and the shaft 14, and for efficient operation this slippage must be accurately controlled. In fact, serious damage to the shaft will result if the slippage drops to zero. Secured to member 16 is an outer drum 17 having in it slots 18 disposed parallel to the shaft 14 and spaced apart an angular distance equal to the angle, taken in a plane perpendicular to shaft 14, subtended by a groove 15. It is apparent that slippage of member 16 with respect to shaft 14 will be indicated by transit of slots 18 over grooves 15, the magnitude of such slippage per unit of time being determined as in the case of the modification of my invention using the disks.

It will be understood that the above description and accompanying drawing comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States for governmental purposes without the payment of any royalty thereon.

I claim:

Means for measuring slippage between a driving shaft and a shaft driven thereby through a connection inherently providing for slippage between said shafts, a drum mounted on said driven shaft and a second drum mounted on an element of said connection, said drums being concentric and disposed one inside the other, the inner one of said drums having on it a plurality of equally spaced, self-luminous, readily visible diagonal markings and the outer one of said drums having in it a plurality of slots parallel to the axis of said shaft through which said markings may be seen, said slots being equally spaced and equal in number to said markings, the said slots transiting said markings when said drums are rotating at different speeds, said markings being so disposed that the adjacent ends of two consecutive markings lie substantially on the same line parallel to the axis of the shaft and the said slots being spaced apart an angular distance equal to that between the lines drawn through the ends of one of said markings and parallel to the said axis.

ROSCOE F. GOOD.